(12) United States Patent
Liu et al.

(10) Patent No.: US 9,530,328 B2
(45) Date of Patent: Dec. 27, 2016

(54) INTELLIGENT TEACHING AND TUTORING TEST METHOD

(71) Applicants: Chien Cheng Liu, Kaohsiung (TW); Kuan Chen Wang, Kaohsiung (TW)

(72) Inventors: Chien Cheng Liu, Kaohsiung (TW); Kuan Chen Wang, Kaohsiung (TW)

(*) Notice: Subject to any disclaimer, the term of this patent is extended or adjusted under 35 U.S.C. 154(b) by 216 days.

(21) Appl. No.: 14/568,123

(22) Filed: Dec. 12, 2014

(65) Prior Publication Data

US 2015/0099256 A1    Apr. 9, 2015

(30) Foreign Application Priority Data

Dec. 17, 2013  (TW) .............................. 102146509 A

(51) Int. Cl.
| | |
|---|---|
| *G09B 7/00* | (2006.01) |
| *G09B 7/02* | (2006.01) |
| *G06F 21/32* | (2013.01) |
| *G09B 5/00* | (2006.01) |

(52) U.S. Cl.
CPC . *G09B 7/00* (2013.01); *G09B 7/02* (2013.01); *G06F 21/32* (2013.01); *G09B 5/00* (2013.01)

(58) Field of Classification Search
CPC ............... G09B 7/00; G09B 7/02; G09B 5/00; G06F 21/32

USPC .......................................................... 434/353
See application file for complete search history.

(56) References Cited

U.S. PATENT DOCUMENTS

| | | | | |
|---|---|---|---|---|
| 5,909,589 | A  * | 6/1999 | Parker .................... | G09B 5/065 |
| | | | | 712/32 |
| 5,947,747 | A  * | 9/1999 | Walker .................... | G09B 7/02 |
| | | | | 380/251 |
| 2004/0161728 | A1* | 8/2004 | Benevento, II ........ | G06Q 10/10 |
| | | | | 434/118 |
| 2012/0077177 | A1* | 3/2012 | Foster .................... | G09B 7/02 |
| | | | | 434/362 |
| 2012/0244508 | A1* | 9/2012 | Katz ....................... | G09B 7/00 |
| | | | | 434/362 |
| 2013/0113628 | A1* | 5/2013 | Shepherd ............. | A61B 5/0476 |
| | | | | 340/573.1 |

* cited by examiner

*Primary Examiner* — Jack Yip

(57) ABSTRACT

An intelligent teaching and tutoring test method is provided with a remote learning online test mode, a remote learning test paper test mode, a classroom teaching online test mode, and a classroom teaching test paper test mode. Based on the diversified data input methods and intelligent data analyzing process offered by an intelligent teaching and tutoring test system, the invention is a proprietary teaching and tutoring test method for different learners according to their differentiated individual learning situations so as to substantially enhance the learning efficiency of the learners.

3 Claims, 1 Drawing Sheet

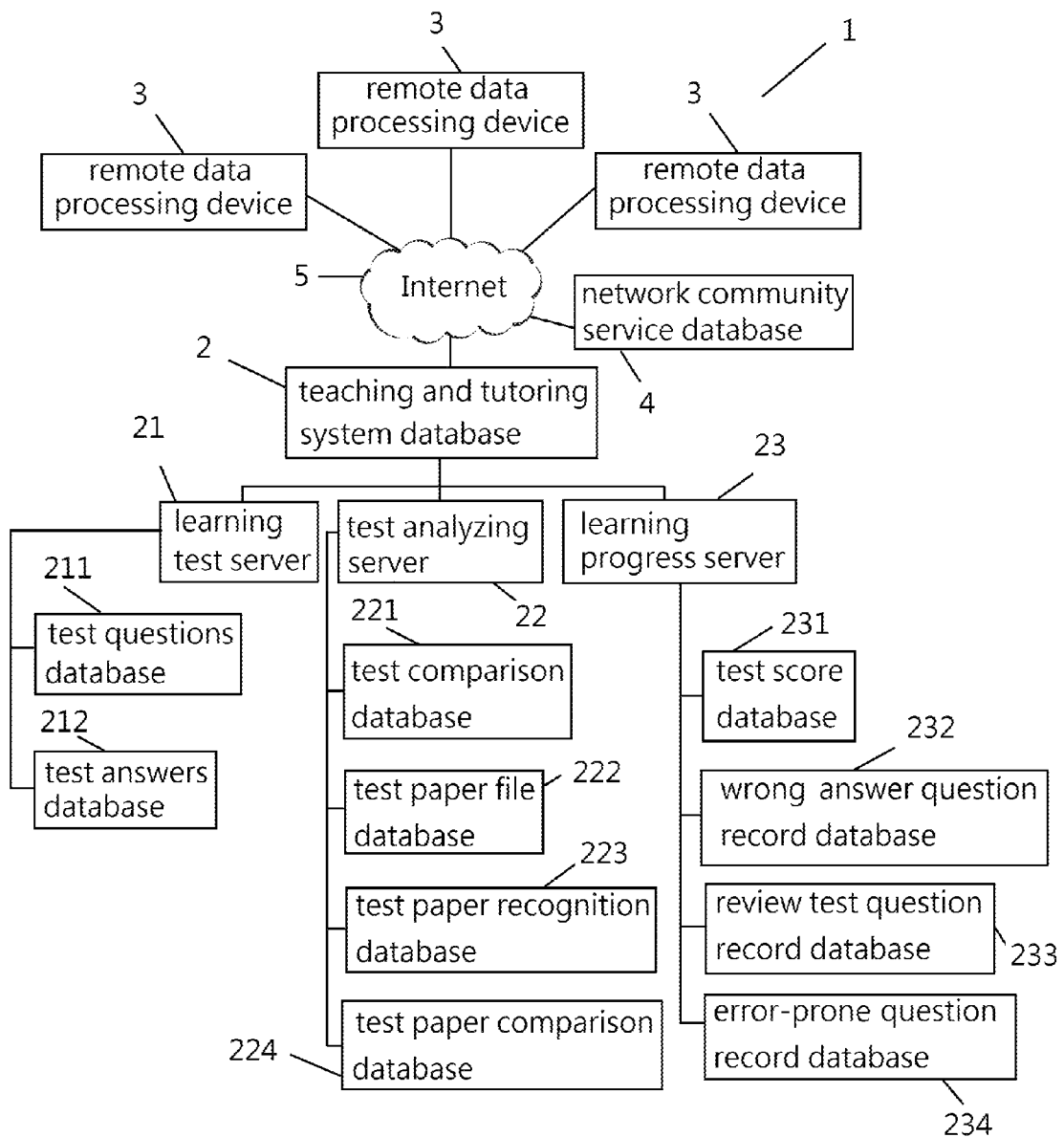

INTELLIGENT TEACHING AND TUTORING TEST METHOD

BACKGROUND OF THE INVENTION

1. Field of the Invention

The invention relates to teaching and tutoring test methods and more particularly to an intelligent teaching and tutoring test method.

2. Description of Related Art

In common teaching courses, in order to check the teaching and learning effects, most instructors would arrange quizzes or learning tests or exams in the class to have a real-time understanding of the actual learning situations of all learners in the class. Then, regarding those units, test item types or wrong answer questions that most learners are unfamiliar with, subsequent teaching and tutoring will be carried out in the class through test paper analyses or intensified courses.

However, such a teaching and tutoring test method is usually subject to the limitation of teaching progress and teaching hours. Hence, most instructors would choose to review the error-prone questions or key questions only. Naturally, the result is uniform teaching and tutoring, instead of personalized teaching and tutoring based on the individual learning situations of different learners. This causes a poor learning effect, and often a waste of time in repetitive practices and reviews of those course units that the learners are already familiar with.

Thus, the need for improvement still exists.

SUMMARY OF THE INVENTION

It is therefore one object of the invention to provide an intelligent teaching and tutoring test method implemented on a teaching and tutoring test system including a teaching and tutoring system database, a network community service database, and a plurality of remote data processing devices wherein the teaching and tutoring system database, the network community service database, and the remote data processing devices are interconnected via the Internet; wherein the teaching and tutoring system database includes a learning test server, a test analyzing server and a learning progress server wherein the learning test server, the test analyzing server, and the learning progress server are interconnected; wherein the learning test server includes a test questions database and a test answers database; wherein the test analyzing server includes a test comparison database, a test paper file database, a test paper recognition database, and a test paper comparison database; and wherein the learning progress server includes a test score record database, a wrong answer question record database, a review test question record database, and an error-prone question record database, the method comprising the steps of allowing a learner to access the test questions database through one of the remote data processing devices; allowing the learner to make an online selection of one of a curriculum test questions bank, a unit test questions bank, an item type test questions bank, a previous learning test questions bank, a previous proficiency test questions bank, an error-prone questions bank, a learning progress questions bank, a review test questions bank, and a proprietary questions bank; allowing the learner to conduct a direct self-learning test through a manual selection or a random computer selection of test questions after answering an online test; causing a master server to compare the learner's answers with answers in a questions bank of the test answers database, and store a test comparison file as comparison and analysis results in the test comparison database; causing the master server to store a test score record of the test comparison file in the test score record database, and store a wrong answer question record of the test comparison file in the wrong answer question record database; causing the master server to calculate and analyze data of wrong answer question records of a plurality of learners in the wrong answer question record database, store analysis results as an error-prone question record, and store the error-prone question record in the error-prone question record database wherein if a test score in the test score record of the test comparison file is less than a score sample level set by the master server, the wrong answer question record stored in the wrong answer question record database will be discarded; causing the master server to calculate and analyze the data of the wrong answer question records in the wrong answer question record database wherein if accumulated wrong answer times of the same question exceed a predetermined standard set by the master server, the master server stores the results as a review test question record, and store the review test question record in the review test question record database; causing the master server to store a test question of the wrong answer question record of the wrong answer question record database in the learning progress questions bank of the test questions database and create proprietary learning progress review test questions data for different learners; causing the master server to store the test question of the review test question record of the review test question record database in the review test questions bank of the test questions database and create proprietary review test questions data for different learners; causing the master server to store the test question of the error-prone question record of the error-prone question record database and create error-prone questions reference data for all learners; causing the master server to randomly select the test questions in the learning progress questions bank or the review test questions bank of the test questions database, store the selected test questions in the proprietary questions bank of the test questions database, and create proprietary teaching and tutoring review test questions data for different learners; and causing the master server to, through the learner's personal account having access to the external network community service database, publish the learner's test score, and upload the test comparison file on the learner's personal webpage in the network community service database so that the learner can refer to the wrong answer question records of the test comparison file, correct and study the wrong answer questions, conduct subsequent reviews, and be capable of utilizing error-prone questions data as reference data for learning.

The above and other objects, features and advantages of the invention will become apparent from the following detailed description taken with the accompanying drawings.

BRIEF DESCRIPTION OF THE DRAWINGS

FIG. 1 is a schematic block diagram of an intelligent teaching and tutoring test system of the invention.

DETAILED DESCRIPTION OF THE INVENTION

Referring to FIG. 1, an intelligent teaching and tutoring test system 1 in accordance with the invention comprises a teaching and tutoring system database 2, a network community service database 4 and a plurality of remote data processing devices 3. The teaching and tutoring system database 2, the network community service database 4 and the remote data processing devices 3 have access to the Internet 5 through network transmission or telecommunication transmission, so that data can be transmitted to each other.

The teaching and tutoring system database 2 comprises a learning test server 21, a test analyzing server 22 and a learning progress server 23. The learning test server 21, the test analyzing server 22 and the learning progress server 23 are connected to each other through cables, so that data can be transmitted to each other. The learning test server 21 comprises a test questions database 211 and a test answers database 212. The test analyzing server 22 comprises a test comparison database 221, a test paper file database 222, a test paper recognition database 223 and a test paper comparison database 224. The learning progress server 23 comprises a test score record database 231, a wrong answer question record database 232, a review test question record database 233 and an error-prone question record database 234.

The test questions database 211 comprises a curriculum test questions bank, a unit test questions bank, an item type test questions bank, a previous learning test questions bank, a previous proficiency test questions bank, an error-prone questions bank, a learning progress questions bank, a review test questions bank and a proprietary questions bank. The test answers database 212 comprises a curriculum test questions bank answers, a unit test questions bank answers, an item type test questions bank answers, a previous learning test questions bank answers, a previous proficiency test questions bank answers, an error-prone questions bank answers, a learning progress questions bank answers, a review test questions bank answers and a proprietary questions bank answers.

The test comparison database 221 is to store the test comparison file generated after the master server compares the answers of the learner in the online test with the corresponding questions bank answers in the test answers database 212. The test paper file database 222 is to store the test paper input file uploaded after scanning or photographing the hardcopy test paper answered by the learner. The test paper recognition database 223 is to store the test paper recognition file generated after the master server conducts a character and image recognition of the test paper input file. The test paper comparison database 224 is to store the test paper comparison file generated after the master server compares the test paper recognition file with the corresponding questions bank answers in the test answers database 212.

The test score record database 231 is to store the test score record of the test comparison file or test paper comparison file of the learner. The wrong answer question record database 232 is to store the wrong answer question record of the test comparison file or test paper comparison file of the learner. The review test question record database 233 is to store the review test question record generated after the master server calculates all the wrong answer question records of the learner. The error-prone question record database 234 is to store the error-prone question record generated after the master server calculates all the wrong answer question records of the learner.

The remote data processing devices 3 refer to smartphones, tablets, laptops or desktops. The network community service database 4 refers to such network community websites as Facebook, Twitter, Google+, Tumblror and LinkedIn. The network transmission refers to wireless network transmission or wired network transmission. The telecommunication transmission refers to 3G, 3.5G or 4G wireless telecommunication transmission.

In common teaching courses, in order to check the teaching and learning effects, most instructors would arrange quizzes or learning tests or exams in the class to have a real-time understanding of the actual learning situations of all learners in the class. Then, regarding those units, test item types or wrong answer questions that most learners are unfamiliar with, subsequent teaching and tutoring will be carried out in the class through test paper analyses or intensified courses. However, such a teaching and tutoring test method is usually subject to the limitation of teaching progress and teaching hours. Hence, most instructors would choose to review the error-prone questions or key questions only. Naturally, the result is uniform teaching and tutoring, instead of personalized teaching and tutoring based on the individual learning situations of different learners. This causes a poor learning effect, and often a waste of time in repetitive practices and reviews of those course units that the learners are already familiar with. Mainly based on the diversified data input methods and intelligent data analyzing process offered by the intelligent teaching and tutoring test system 1, the invention provides a proprietary teaching and tutoring test method for different learners according to their differentiated individual learning situations, so as to substantially enhance the learning efficiency of the learners.

An intelligent teaching and tutoring test method tied to the intelligent teaching and tutoring test system 1 comprises a remote learning online test mode, a remote learning test paper test mode, a classroom teaching online test mode and a classroom teaching test paper test mode.

The remote learning online test mode comprises a realization that the learner can, at any time, access the test questions database 211 of the learning test server 21 of the teaching and tutoring system database 2 through the remote data processing device 3, to make a direct and relevant online selection of the curriculum test questions bank, the unit test questions bank, the item type test questions bank, the previous learning test questions bank, the previous proficiency test questions bank, the error-prone questions bank, the learning progress questions bank, the review test questions bank or the proprietary questions bank, and to conduct a direct self-learning test through manual selection or random computer selection of the test questions. In particular, after the learner has finished answering the online test, the master server will compare the learner's answers with the questions bank answers of the test answers database 212 of the learning test server 21 of the teaching and tutoring system database 2, and store the test comparison file with the comparison and analysis results in the test comparison database 221 of the test analyzing server 22 of the teaching and tutoring system database 2.

Meanwhile, the master server will respectively store the test score record of the test comparison file in the test score record database 231 of the learning progress server 23 of the teaching and tutoring system database 2, and store the wrong answer question record of the test comparison file in the wrong answer question record database 232 of the learning progress server 23 of the teaching and tutoring system database 2. Then, the master server will calculate and analyze the data of those wrong answer question records of all learners in the wrong answer question record database 232 and store the results as an error-prone question record, and store it in the error-prone question record database 234 of the learning progress server 23 of the teaching and tutoring system database 2. If the test score record of the test comparison file is lower than the score sample level set by the master server, the wrong answer question record stored in the corresponding wrong answer question record database 232 will not be included in the reference data to be calculated and analyzed by the master server, Meanwhile, the master server will calculate and analyze the data of all those wrong answer question records of the learner in the wrong answer question record database 232, if the accumulated wrong answer times of the same question exceed the predetermined standard set by the master server, the master server will store the results as a review test question record, and store it in the review test question record database 233 of the learning progress server 23 of the teaching and tutoring system database 2.

And the master server will store the test question corresponding to the wrong answer question record of the wrong answer question record database 232 in the learning progress questions bank of the test questions database 211 of the learning test server 21 of the teaching and tutoring system database 2, so as to create proprietary learning progress review test questions data for different learners. The master server will store the test question corresponding to the review test question record of the review test question record database 233 in the review test questions bank of the test questions database 211 of the learning test server 21 of the teaching and tutoring system database 2, so as to create proprietary review test questions data for different learners. The master server will store the test question corresponding to the error-prone question record of the error-prone question record database 234 in the error-prone questions bank of the test questions database 211 of the learning test server 21, so as to create error-prone questions reference data for all learners.

The master server will randomly select corresponding test questions in the learning progress questions bank or the review test questions bank of the test questions database 211 of the learning test server 21 of the teaching and tutoring system database 2, and store them in the proprietary questions bank of the test questions database 211 of the learning test server 21 of the teaching and tutoring system database 2, so as to create proprietary teaching and tutoring review test questions data for different learners. Alternatively, the system administrator can manually select, through the master server, corresponding test questions in the learning progress questions bank or the review test questions bank of the test questions database 211 of the learning test server 21 of the teaching and tutoring system database 2, and store them in the proprietary questions bank of the test questions database 211 of the learning test server 21 of the teaching and tutoring system database 2, so as to create proprietary teaching and tutoring review test questions data for different learners.

The master server can, through the learner's personal account having access to the external network community service database 4, further publish the learner's test score and upload the relevant test comparison file on the learner's personal webpage in the network community service database 4, so that the learner can refer to the wrong answer question records of the test comparison file, to correct and study the wrong answer questions and conduct subsequent reviews, and meanwhile provide the learner with real-time error-prone questions data as reference data for learning.

The remote learning test paper test mode comprises a realization that: the learner can, at any time, access the test questions database 211 of the learning test server 21 of the teaching and tutoring system database 2 through the remote data processing device 3, to make a direct and relevant online selection of the curriculum test questions bank, the unit test questions bank, the item type test questions bank, the previous learning test questions bank, the previous proficiency test questions bank, the error-prone questions bank, the learning progress questions bank, the review test questions bank or the proprietary questions bank, and further through manual selection or random computer selection of the test questions, print or photocopy the test questions into a hardcopy test paper, so that the learner can conduct a self-learning test on the hardcopy test paper.

After answering the hardcopy test paper, the learner can, through scanning or photographing, convert the answered hardcopy test paper into an electronic file, and transmit it to the master server through email or uploading, and store it as a test paper input file through the master server and store it in the test paper file database 222 of the test analyzing server 22 of the teaching and tutoring system database 2. Then the master server will conduct a character and image recognition of the test paper input file and store it as a test paper recognition file, and store it in the test paper recognition database 223 of the test analyzing server 22 of the teaching and tutoring system database 2; and the master server can immediately compare the answers in the test paper recognition file with the corresponding questions bank answers of the test answers database 212 of the learning test server 21 of the teaching and tutoring system database 2, and store the test paper comparison file with the comparison and analysis results in the test paper comparison database 224 of the test analyzing server 22 of the teaching and tutoring system database 2.

Meanwhile, the master server will respectively store the test score record of the test paper comparison file in the test score record database 231 of the learning progress server 23 of the teaching and tutoring system database 2, and store the wrong answer question record of the test paper comparison file in the wrong answer question record database 232 of the learning progress server 23 of the teaching and tutoring system database 2. Then, the server will calculate and analyze the data of those wrong answer question records of all learners in the wrong answer question record database 232 and store the results as an error-prone question record, and store it in the error-prone question record database 234 of the learning progress server 23 of the teaching and tutoring system database 2. If the test paper score record of the test paper comparison file is lower than the score sample level set by the master server, the wrong answer question record stored in the corresponding wrong answer question record database 232 will not be included in the reference data to be calculated and analyzed by the master server; meanwhile, the master server will calculate and analyze the data of all those wrong answer question records of the learner in the wrong answer question record database 232, if the accumulated wrong answer times of the same question exceed the predetermined standard set by the master server, the master server will store the results as a review test question record, and store it in the review test question record database 233 of the learning progress server 23 of the teaching and tutoring system database 2.

And the master server will store the test question corresponding to the wrong answer question record of the wrong answer question record database 232 in the learning progress questions bank of the test questions database 211 of the learning test server 21 of the teaching and tutoring system database 2, so as to create proprietary learning progress review test questions data for different learners. The master server will store the test question corresponding to the review test question record of the review test question record database 233 in the review test questions bank of the test questions database 211 of the learning test server 21 of the teaching and tutoring system database 2, so as to create proprietary review test questions data for different learners. The master server will store the test question corresponding to the error-prone question record of the error-prone question record database 234 in the error-prone questions bank of the test questions database 211 of the learning test server 21, so as to create error-prone questions reference data for all learners.

The master server will randomly select corresponding test questions in the learning progress questions bank or the review test questions bank of the test questions database 211 of the learning test server 21 of the teaching and tutoring system database 2, and store them in the proprietary questions bank of the test questions database 211 of the learning test server 21 of the teaching and tutoring system database 2, so as to create proprietary teaching and tutoring review test questions data for different learners. Alternatively, the system administrator can manually select, through the master server, corresponding test questions in the learning progress questions bank or the review test questions bank of the test questions database 211 of the learning test server 21 of the teaching and tutoring system database 2, and store them in the proprietary questions bank of the test questions database 211 of the learning test server 21 of the teaching and tutoring system database 2, so as to create proprietary teaching and tutoring review test questions data for different learners.

The master server can, through the learner's personal account having access to the external network community service database 4, further publish the learner's test score and upload the relevant test paper comparison file on the learner's personal webpage in the network community service database 4, so that the learner can refer to the wrong answer question records of the test paper comparison file, to correct and study the wrong answer questions and conduct subsequent reviews, and meanwhile provide the learner with real-time error-prone questions data as reference data for learning.

The classroom teaching online test mode comprises an instructor and at least one learner, during a test in physical classroom teaching, the instructor and the learner can both access the test questions database 211 of the learning test server 21 of the teaching and tutoring system database 2 through a personal remote data processing device 3, to make a direct and relevant online selection of the curriculum test questions bank, the unit test questions bank, the item type test questions bank, the previous learning test questions bank, the previous proficiency test questions bank, the error-prone questions bank, the learning progress questions bank, the review test questions bank or the proprietary questions bank; an instructor can request a specific learner or all learners to take a direct online classroom learning test, through manual selection or random computer selection of the test questions. In particular, after the learner has finished answering the online test, the master server will compare the answers with the corresponding questions bank answers of the test answers database 212 of the learning test server 21 of the teaching and tutoring system database 2, and store the test comparison file with the comparison and analysis results in the test comparison database 221 of the test analyzing server 22 of the teaching and tutoring system database 2.

Meanwhile, the master server will respectively store the test score record of the test comparison file in the test score record database 231 of the learning progress server 23 of the teaching and tutoring system database 2, and store the wrong answer question record of the test comparison file in the wrong answer question record database 232 of the learning progress server 23 of the teaching and tutoring system database 2. Then, the server will calculate and analyze the data of those wrong answer question records of all learners in the wrong answer question record database 232 and store the results as an error-prone question record, and store it in the error-prone question record database 234 of the learning progress server 23 of the teaching and tutoring system database 2. If the test score record of the test comparison file is lower than the score sample level set by the master server, the wrong answer question record stored in the corresponding wrong answer question record database 232 will not be included in the reference data to be calculated and analyzed by the master server. Meanwhile, the master server will calculate and analyze the data of all those wrong answer question records of the learner in the wrong answer question record database 232, if the accumulated wrong answer times of the same question exceed the predetermined standard set by the master server, the master server will store the results as a review test question record, and store it in the review test question record database 233 of the learning progress server 23 of the teaching and tutoring system database 2.

And the master server will store the test question corresponding to the wrong answer question record of the wrong answer question record database 232 in the learning progress questions bank of the test questions database 211 of the learning test server 21 of the teaching and tutoring system database 2, so as to create proprietary learning progress review test questions data for different learners. The master server will store the test question corresponding to the review test question record of the review test question record database 233 in the review test questions bank of the test questions database 211 of the learning test server 21 of the teaching and tutoring system database 2, so as to create proprietary review test questions data for different learners. The master server will store the test question corresponding to the error-prone question record of the error-prone question record database 234 in the error-prone questions bank of the test questions database 211 of the learning test server 21, so as to create error-prone questions reference data for all learners.

The master server will randomly select corresponding test questions in the learning progress questions bank or the review test questions bank of the test questions database 211 of the learning test server 21 of the teaching and tutoring system database 2, and store them in the proprietary questions bank of the test questions database 211 of the learning test server 21 of the teaching and tutoring system database 2, so as to create proprietary teaching and tutoring review test questions data for different learners. Alternatively, an instructor can, through the master server, manually select corresponding test questions in the learning progress questions bank or the review test questions bank of the test questions database 211 of the learning test server 21 of the teaching and tutoring system database 2, and store them in the proprietary questions bank of the test questions database 211 of the learning test server 21 of the teaching and tutoring system database 2, so as to create proprietary teaching and tutoring review test questions data for different learners.

The master server can, through the learner's personal account having access to the external network community service database 4, further publish the learner's personal test score and upload the relevant test comparison file on the learner's personal webpage in the network community service database 4, so that the learner can refer to the wrong answer question records of the test comparison file, to correct and study the wrong answer questions. The master server also has access to the instructor's account in the external network community service database 4, and can further publish the test score and upload the test comparison file of a specific learner or all learners on the instructor's personal homepage in the network community service database 4, and can meanwhile provide the instructor with real-time error-prone questions data as reference data for classroom teaching; And the instructor can carry out real-time wrong answer questions tutoring and provide additional teaching in the physical class based on the wrong answer question record or error-prone questions data in the test comparison file.

The classroom teaching test paper test mode comprises an instructor and at least one learner, who can access the teaching and tutoring system database 2 through a personal remote data processing device 3. The instructor can access the test questions database 211 of the learning test server 21 of the teaching and tutoring system database 2 through the remote data processing device 3, to make a direct and relevant online selection of the curriculum test questions bank, the unit test questions bank, the item type test questions bank, the previous learning test questions bank, the previous proficiency test questions bank, the error-prone questions bank, the learning progress questions bank, the review test questions bank or the proprietary questions bank, and further through manual selection or random computer selection of the test questions, print or photocopy the test questions into a hardcopy test paper, so that the instructor can carry out a classroom learning test in physical classroom teaching by providing a hardcopy test paper to the learners.

After a learner has answered the hardcopy test paper, the instructor can immediately convert the answered hardcopy test paper into an electronic file through scanning, and transmit it to the master server through email or uploading, and store it as a test paper input file through the master server and store it in the test paper file database 222 of the test analyzing server 22 of the teaching and tutoring system database 2. Then the master server will conduct a character and image recognition of the test paper input file and store it as a test paper recognition file, and store it in the test paper recognition database 223 of the test analyzing server 22 of the teaching and tutoring system database 2; and the master server can immediately compare the answers in the test paper recognition file with the corresponding questions bank answers of the test answers database 212 of the learning test server 21 of the teaching and tutoring system database 2, and store the test paper comparison file with the comparison and analysis results in the test paper comparison database 224 of the test analyzing server 22 of the teaching and tutoring system database 2.

Meanwhile, the master server will respectively store the test score record of the test paper comparison file in the test score record database 231 of the learning progress server 23 of the teaching and tutoring system database 2 and store the wrong answer question record of the test paper comparison file in the wrong answer question record database 232 of the learning progress server 23 of the teaching and tutoring system database 2. Then, the server will calculate and analyze the data of those wrong answer question records of all learners in the wrong answer question record database 232 and store the results as an error-prone question record, and store it in the error-prone question record database 234 of the learning progress server 23 of the teaching and tutoring system database 2; wherein, if the test paper score record of the test paper comparison file is lower than the score sample level set by the master server, the wrong answer question record stored in the corresponding wrong answer question record database 232 will not be included in the reference data to be calculated and analyzed by the master server. Meanwhile, the master server will calculate and analyze the data of all those wrong answer question records of the learner in the wrong answer question record database 232, if the accumulated wrong answer times of the same question exceed the predetermined standard set by the master server, the master server will store the results as a review test question record, and store it in the review test question record database 233 of the learning progress server 23 of the teaching and tutoring system database 2.

And the master server will store the test question corresponding to the wrong answer question record of the wrong answer question record database 232 in the learning progress questions bank of the test questions database 211 of the learning test server 21 of the teaching and tutoring system database 2, so as to create proprietary learning progress review test questions data for different learners. The master server will store the test question corresponding to the review test question record of the review test question record database 233 in the review test questions bank of the test questions database 211 of the learning test server 21 of the teaching and tutoring system database 2, so as to create proprietary review test questions data for different learners. The master server will store the test question corresponding to the error-prone question record of the error-prone question record database 234 in the error-prone questions bank of the test questions database 211 of the learning test server 21, so as to create error-prone questions reference data for all learners.

The master server will randomly select corresponding test questions in the learning progress questions bank or the review test questions bank of the test questions database 211 of the learning test server 21 of the teaching and tutoring system database 2, and store them in the proprietary questions bank of the test questions database 211 of the learning test server 21 of the teaching and tutoring system database 2, so as to create proprietary teaching and tutoring review test questions data for different learners. Alternatively, an instructor can, through the master server, manually select corresponding test questions in the learning progress questions bank or the review test questions bank of the test questions database 211 of the learning test server 21 of the teaching and tutoring system database 2, and store them in the proprietary questions bank of the test questions database 211 of the learning test server 21 of the teaching and tutoring system database 2, so as to create proprietary teaching and tutoring review test questions data for different learners.

The master server can, through the learner's personal account having access to the external network community service database 4, further publish the learner's personal test score and upload the relevant test paper comparison file on the learner's personal webpage in the network community service database 4, so that the learner can refer to the wrong answer question records of the test paper comparison file, to correct and study the wrong answer questions. The master server also has access to the instructor's account in the external network community service database 4, and can publish the test scores and upload the test paper comparison files of all learners on the instructor's personal homepage in the network community service database 4, and can meanwhile provide the instructor with real-time error-prone questions data as reference data for classroom teaching; and the instructor can carry out real-time wrong answer questions tutoring and provide additional teaching in the physical class based on the wrong answer question record or error-prone questions data in the test paper comparison file.

Mainly through the master server of the teaching and tutoring system database 2 of the intelligent teaching and tutoring test system 1, the intelligent teaching and tutoring test method can comprehensively compare and analyze the teaching and tutoring tests of all learners, and can respectively establish a proprietary learning progress database for each individual learner based on the test-related reference data.

The remote learning online test mode and the remote learning test paper test mode of the intelligent teaching and tutoring test method enables each individual learner to take a remote teaching and tutoring test with no limitation by external environmental factors such as time, place and weather. The learner can independently plan a specific learning time frame or just use short vacancies to take real-time online tests to effectively understand his/her current learning situation and know which units and question item types need to be intensified, so as to achieve optimum learning effect in the shortest time possible. And the classroom teaching online test mode and the classroom teaching test paper test mode enables an instructor to use teaching and tutoring tests to effectively understand the learning situations of all learners and the units and question item types that need to be intensified for each individual learner, so that the instructor can provide corresponding teaching and tutoring tests based on the differentiated learning situations of different learners. This can help realize individualized teaching and avoid waste of time in repetitive practices and reviews of those course units that the learners are already familiar with, and substantially enhance the learning efficiency of the learners.

The intelligent teaching and tutoring test method also provides diversified data input methods. In particular, the remote learning online test mode and the classroom teaching online test mode enable learners to access the teaching and tutoring system database 2 through remote data processing devices 3, and to take direct online teaching and tutoring tests. And the remote learning test paper test mode and the classroom teaching test paper test mode accepts traditional hardcopy test papers that are familiar to the learners, and realizes the possibility that the learners can convert already-answered hardcopy test papers into electronic files through scanning or photographing, and transmit them to the master server by email or uploading, so as to carry out teaching and tutoring tests. In particular, the master server provides a character and image recognition function for the test paper input files, so as to carry out subsequent automatic procedures of test paper recognition, comparison and data storage and analysis, and subsequently store labor and time needed in traditional reviews of the test papers.

While the invention has been described in terms of preferred embodiments, those skilled in the art will recognize that the invention can be practiced with modifications within the spirit and scope of the appended claims.

What is claimed is:

1. An intelligent teaching and tutoring test method implemented on a teaching and tutoring test system including a teaching and tutoring system database, a network community service database, and a plurality of remote data processing devices wherein the teaching and tutoring system database, the network community service database, and the remote data processing devices are interconnected via the Internet; wherein the teaching and tutoring system database includes a learning test server, a test analyzing server, and a learning progress server wherein the learning test server, the test analyzing server, and the learning progress server are interconnected; wherein the learning test server includes a test questions database and a test answers database; wherein the test analyzing server includes a test comparison database, a test paper file database, a test paper recognition database, and a test paper comparison database; and wherein the learning progress server includes a test score record database, a wrong answer question record database, a review test question record database, and an error-prone question record database, the method comprising the steps of:

(a) allowing a learner to access the test questions database through one of the remote data processing devices;

(b) allowing the learner to make an online selection of one of a curriculum test questions bank, a unit test questions bank, an item type test questions bank, a previous learning test questions bank, a previous proficiency test questions bank, an error-prone questions bank, a learning progress questions bank, a review test questions bank, and a proprietary questions bank;

(c) allowing the learner to conduct a direct self-learning test through a manual selection or a random computer selection of test questions after answering an online test;

(d) causing a master server to compare the learner's answers with answers in a questions bank of the test answers database, and store a test comparison file as comparison and analysis results in the test comparison database;

(e) causing the master server to store a test score record of the test comparison file in the test score record database, and store a wrong answer question record of the test comparison file in the wrong answer question record database;

(f) causing the master server to calculate and analyze data of wrong answer question records of a plurality of learners in the wrong answer question record database, store analysis results as an error-prone question record, and store the error-prone question record in the error-prone question record database wherein if a test score in the test score record of the test comparison file is less than a score sample level set by the master server, the wrong answer question record stored in the wrong answer question record database will be discarded;

(g) causing the master server to calculate and analyze the data of the wrong answer question records in the wrong answer question record database wherein if accumulated wrong answer times of the same question exceed a predetermined standard set by the master server, the master server stores the results as a review test question record, and store the review test question record in the review test question record database;

(h) causing the master server to store a test question of the wrong answer question record of the wrong answer question record database in the learning progress questions bank of the test questions database and create proprietary learning progress review test questions data for different learners;

(i) causing the master server to store the test question of the review test question record of the review test question record database in the review test questions bank of the test questions database and create proprietary review test questions data for different learners;

(j) causing the master server to store the test question of the error-prone question record of the error-prone question record database and create error-prone questions reference data for all learners;

(k) causing the master server to randomly select the test questions in the learning progress questions bank or the review test questions bank of the test questions database, store the selected test questions in the proprietary questions bank of the test questions database, and create proprietary teaching and tutoring review test questions data for different learners; and (l) causing the master server to, through the learner's personal account having access to an external network community service database, publish the learner's test score, and upload the test comparison file on the learner's personal webpage in the external network community service database so that the learner can refer to the wrong answer question records of the test comparison file, correct and study the wrong answer questions, conduct subsequent reviews, and be capable of utilizing error-prone questions data as reference data for learning.

2. An intelligent teaching and tutoring test method implemented on a teaching and tutoring test system including a teaching and tutoring system database, a network community service database, and a plurality of remote data processing devices wherein the teaching and tutoring system database, the network community service database, and the remote data processing devices are interconnected via the Internet; wherein the teaching and tutoring system database includes a learning test server, a test analyzing server, and a learning progress server wherein the learning test server, the test analyzing server, and the learning progress server are interconnected; wherein the learning test server includes a test questions database and a test answers database; wherein the test analyzing server includes a test comparison database, a test paper file database, a test paper recognition database, and a test paper comparison database; and wherein the learning progress server includes a test score record database, a wrong answer question record database, a review test question record database, and an error-prone question record database, the method comprising the steps of:

(a) allowing a learner to access the test questions database through one of the remote data processing devices;

(b) allowing the learner to make an online selection of one of a curriculum test questions bank, a unit test questions bank, an item type test questions bank, a previous learning test questions bank, a previous proficiency test questions bank, an error-prone questions bank, a learning progress questions bank, a review test questions bank, and a proprietary questions bank;

(c) allowing the learner to conduct a self-learning test on a test paper;

(d) allowing the learner to convert the answered test paper into an electronic file, transmit the electronic file to a master server, store the electronic file as a test paper input file, and store the electronic file as a test paper input file in the test paper file database;

(e) causing the master server to conduct a character and image recognition of the test paper input file, store the test paper input file as a test paper recognition file, and store the test paper recognition file in the test paper recognition database;

(f) causing the master server to compare answers in the test paper recognition file with answers in a questions bank of the test answers database to create a test paper comparison file, and store the test paper comparison file in the test paper comparison database;

(g) causing the master server to store a test score record of the test paper comparison file in the test score record database, and store a wrong answer question record of the test paper comparison file in the wrong answer question record database;

(h) causing the master server to calculate and analyze data of wrong answer question records of a plurality of learners in the wrong answer question record database, store analysis results as an error-prone question record, and store the error-prone question record in the error-prone question record database wherein if a test score in the test score record of the test paper comparison file is less than a score sample level set by the master server, the wrong answer question record stored in the wrong answer question record database will be discarded;

(i) causing the master server to calculate and analyze the data of the wrong answer question records in the wrong answer question record database wherein if accumulated wrong answer times of the same question exceed a predetermined standard set by the master server, the master server stores the results as a review test question record, and store the review test question record in the review test question record database;

(j) causing the master server to store a test question of the wrong answer question record of the wrong answer question record database in the learning progress questions bank of the test questions database and create proprietary learning progress review test questions data for different learners;

(k) causing the master server to store the test question of the review test question record of the review test question record database in the review test questions bank of the test questions database and create proprietary review test questions data for different learners;

(l) causing the master server to store the test question of the error-prone question record of the error-prone question record database and create error-prone questions reference data for all learners;

(m) causing the master server to randomly select the test questions in the learning progress questions bank or the review test questions bank of the test questions database, store the selected test questions in the proprietary questions bank of the test questions database, and create proprietary teaching and tutoring review test questions data for different learners; and (n) causing the master server to, through the learner's personal account having access to an external network community service database, publish the learner's test score, and upload the test comparison file on the learner's personal webpage in the external network community service database so that the learner can refer to the wrong answer question records of the test comparison file, correct and study the wrong answer questions, conduct subsequent reviews, and be capable of utilizing error-prone questions data as reference data for learning.

3. An intelligent teaching and tutoring test method implemented on a teaching and tutoring test system including a teaching and tutoring system database, a network community service database, and a plurality of remote data processing devices wherein the teaching and tutoring system database, the network community service database, and the remote data processing devices are interconnected via the Internet; wherein the teaching and tutoring system database includes a learning test server, a test analyzing server, and a learning progress server wherein the learning test server, the test analyzing server, and the learning progress server are interconnected; wherein the learning test server includes a test questions database and a test answers database; wherein the test analyzing server includes a test comparison database, a test paper file database, a test paper recognition database, and a test paper comparison database; and wherein the learning progress server includes a test score record database, a wrong answer question record database, a review test question record database, and an error-prone question record database, the method comprising the steps of:

(a) allowing an instructor and at least one learner, during a test in physical classroom teaching, to access the test questions database through one of the remote data processing device;

(b) allowing the instructor and the at least one learner to make an online selection of one of a curriculum test questions bank, a unit test questions bank, an item type test questions bank, a previous learning test questions bank, a previous proficiency test questions bank, an error-prone questions bank, a learning progress questions bank, a review test questions bank, and a proprietary questions bank;

(c) causing a master server to compare the learner's answers with answers in a questions bank of the test answers database, and store a test comparison file as comparison and analysis results in the test comparison database;

(d) causing the master server to store a test score record of the test comparison file in the test score record database, and store a wrong answer question record of the test comparison file in the wrong answer question record database;

(e) causing the master server to calculate and analyze data of wrong answer question records of a plurality of learners in the wrong answer question record database, store analysis results as an error-prone question record, and store the error-prone question record in the error-prone question record database wherein if a test score in the test score record of the test comparison file is less than a score sample level set by the master server, the wrong answer question record stored in the wrong answer question record database will be discarded;

(f) causing the master server to calculate and analyze the data of the wrong answer question records in the wrong answer question record database wherein if accumulated wrong answer times of the same question exceed a predetermined standard set by the master server, the master server stores the results as a review test question record, and store the review test question record in the review test question record database;

(g) causing the master server to store a test question of the wrong answer question record of the wrong answer question record database in the learning progress questions bank of the test questions database and create proprietary learning progress review test questions data for different learners;

(h) causing the master server to store the test question of the review test question record of the review test question record database in the review test questions bank of the test questions database and create proprietary intensifying review test questions data for different learners;

(i) causing the master server to store the test question of the error-prone question record of the error-prone question record database and create error-prone questions reference data for all learners;

(j) causing the master server to randomly select the test questions in the learning progress questions bank or the review test questions bank of the test questions database, store the selected test questions in the proprietary questions bank of the test questions database, and create proprietary teaching and tutoring review test questions data for different learners; and (k) causing the master server to, through the learner's personal account having access to an external network community service database, publish the learner's test score, and upload the test comparison file on the learner's personal webpage in the external network community service database so that the learner can refer to the wrong answer question records of the test comparison file, correct and study the wrong answer questions, conduct subsequent intensifying reviews, and be capable of utilizing error-prone questions data as reference data for learning.

* * * * *